(12) United States Patent
Wu et al.

(10) Patent No.: US 9,369,245 B2
(45) Date of Patent: *Jun. 14, 2016

(54) METHOD FOR COORDINATING TRANSMISSIONS BETWEEN DIFFERENT COMMUNICATIONS APPARATUSES AND COMMUNICATION SAPPARATUSES UTILIZING THE SAME

(71) Applicant: MediaTek Inc., Hsin-Chu (TW)

(72) Inventors: Ciou-Ping Wu, Toucheng Township, Yilan County (TW); Chien-Hwa Hwang, Zhubei (TW); Yu-Hao Chang, Daya Township, Taichung County (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/514,715

(22) Filed: Oct. 15, 2014

(65) Prior Publication Data

US 2015/0029993 A1 Jan. 29, 2015

Related U.S. Application Data

(63) Continuation of application No. 13/164,324, filed on Jun. 20, 2011, now Pat. No. 8,923,126.

(60) Provisional application No. 61/408,868, filed on Nov. 1, 2010, provisional application No. 61/388,681, filed (Continued)

(51) Int. Cl.
*H04W 80/04* (2009.01)
*H04W 88/06* (2009.01)
(Continued)

(52) U.S. Cl.
CPC .............. *H04L 5/0032* (2013.01); *H04B 15/00* (2013.01); *H04L 1/1861* (2013.01); *H04L 5/0053* (2013.01); *H04L 27/2601* (2013.01); *H04W 24/02* (2013.01); *H04W 72/1289* (2013.01)

(58) Field of Classification Search
CPC ..... H04W 80/04; H04W 88/06; H04W 28/04; H04W 72/04
USPC .................................................. 370/328, 329
See application file for complete search history.

(56) References Cited

U.S. PATENT DOCUMENTS

2008/0151783 A1 6/2008 Bamba
2009/0252077 A1* 10/2009 Khandekar et al. ........... 370/312
(Continued)

FOREIGN PATENT DOCUMENTS

CN        101577972      11/2009
WO     WO 2009/126658    10/2009
(Continued)

OTHER PUBLICATIONS

English language translation of abstract of CN 101577972 (published Nov. 11, 2009).

(Continued)

*Primary Examiner* — Ronald B Abelson
(74) *Attorney, Agent, or Firm* — McClure, Qualey & Rodack, LLP

(57) ABSTRACT

A communications apparatus is provided. A controller module obtains information regarding a Hybrid Automatic Repeat Request (HARQ) round trip time (RTT) in an HARQ process, arranging one or more almost blank sub-frame(s) in one or more frame(s) according to the HARQ RTT information and generating a sub-frame pattern describing the arrangement of the almost blank sub-frame(s), wherein the HARQ RTT is defined by the communications system. A transceiver module transmits at least a signal carrying information regarding the sub-frame pattern to a peer communications apparatus in the communications system. In addition, at least one almost blank sub-frame in the sub-frame pattern is arranged in a sub-frame for the peer communications apparatus to transmit an uplink grant message for granting an user equipment to transmit uplink data to the peer communications apparatus.

6 Claims, 17 Drawing Sheets

Related U.S. Application Data on Oct. 1, 2010, provisional application No. 61/356,727, filed on Jun. 21, 2010, provisional application No. 61/356,092, filed on Jun. 18, 2010, provisional application No. 61/356,090, filed on Jun. 18, 2010.

(51) Int. Cl.
| | | |
|---|---|---|
| *H04W 28/04* | (2009.01) | |
| *H04W 72/04* | (2009.01) | |
| *H04L 5/00* | (2006.01) | |
| *H04W 72/12* | (2009.01) | |
| *H04L 1/18* | (2006.01) | |
| *H04B 15/00* | (2006.01) | |
| *H04L 27/26* | (2006.01) | |
| *H04W 24/02* | (2009.01) | |

(56) References Cited

U.S. PATENT DOCUMENTS

| | | |
|---|---|---|
| 2010/0110964 A1 | 5/2010 | Love et al. |
| 2010/0227606 A1* | 9/2010 | Nan et al. ............... 455/422.1 |
| 2011/0275394 A1 | 11/2011 | Song et al. |
| 2012/0093012 A1 | 4/2012 | Pedersen et al. |

FOREIGN PATENT DOCUMENTS

| | | |
|---|---|---|
| WO | WO 2010/006285 | 1/2010 |
| WO | WO 2010/039739 | 4/2010 |

OTHER PUBLICATIONS

Ericsson, et al.; "Considerations on Non-CA Based Heterogeneous Deployments;" 3GPP TSG-RAN WG1 #61 Montreal Canada, R1-102618, May 14, 2010 the sections 1-2.

NTT DOCOMO; "Interference Coordination for Non-CA-based Heterogeneous Networks;" 3GPP TSG RAN WG1 Meeting #60bis Beijing China, R1-102307, Apr. 16, 2010.

Ericsson et al.; "Details of Almost Blank Subframes;" 3GPP TSG RAN WG1 Meeting #62bis Xian China, R1-105335, Oct. 15, 2010 the whole document.

"Network Assisted Interference Coordination between Macro eNodeB and Home eNodeB in Downlink;" TSG-RAN Working Group 4 (Radio) meeting; Oct. 2009; pp. 1-5.

"Uplink-downlink Subframe Configuration Information for the Served Cell;" 3GPP TSG RAN WG3 Meeting #61bis; Oct. 2008; pp. 1-2.

"Technology Aspects for Heterogeneous Network for LTE-A;" Alcatel-Lucent, Alcatel-Lucent Shanghai Bell; 3GPP TSG RAN WG1 #59; Nov. 2009.

* cited by examiner

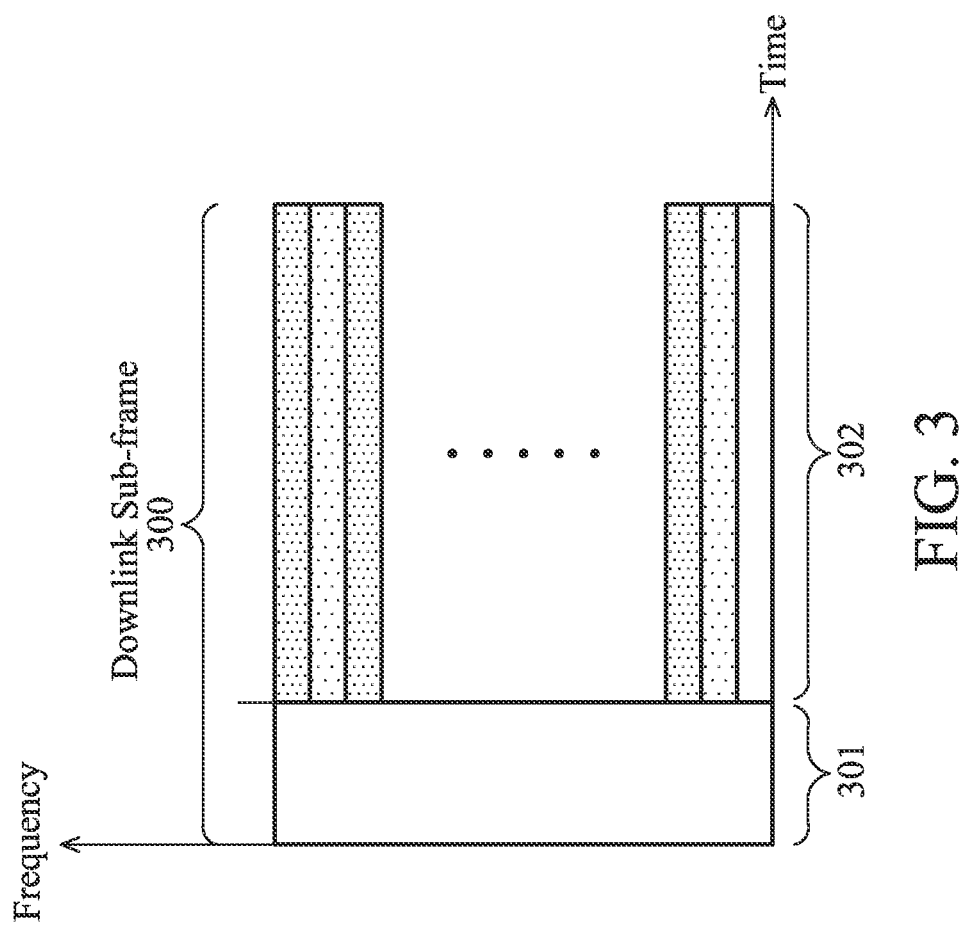

| TDD UL/DL configuration | Sub-frame index | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

FIG. 8

| TDD UL/DL configuration | Sub-frame index | | | | | | | | | |
|---|---|---|---|---|---|---|---|---|---|---|
| | 0 | 1 | 2 | 3 | 4 | 5 | 6 | 7 | 8 | 9 |
| 1 |   | 6 |   |   | 4 |   | 6 |   |   | 4 |
| 2 |   |   |   | 4 |   |   |   |   | 4 |   |
| 3 | 4 |   |   |   |   |   |   |   | 4 | 4 |
| 4 |   |   |   |   |   |   |   |   | 4 | 4 |
| 5 |   |   |   |   |   |   |   |   | 4 |   |
| 6 | 7 | 7 |   |   |   | 7 | 7 |   |   | 5 |

FIG. 9a

| TDD UL/DL configuration | Sub-frame index | | | | | | | | | |
|---|---|---|---|---|---|---|---|---|---|---|
| | 0 | 1 | 2 | 3 | 4 | 5 | 6 | 7 | 8 | 9 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

FIG. 9b

| TDD UL/DL configuration | Sub-frame index | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | 4 | 6 | | | | |

FIG. 12a

| TDD UL/DL configuration | Sub-frame index | | | | | | | | | |
|---|---|---|---|---|---|---|---|---|---|---|
| | 0 | 1 | 2 | 3 | 4 | 5 | 6 | 7 | 8 | 9 |
| 0 | 7 | 7 | | | 7 | 7 | 7 | | | |

FIG. 12b

| TDD UL/DL configuration | Sub-frame index | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |

FIG. 13a

| TDD UL/DL configuration | Sub-frame index | | | | | | | | | |
|---|---|---|---|---|---|---|---|---|---|---|
| | 0 | 1 | 2 | 3 | 4 | 5 | 6 | 7 | 8 | 9 |
| 0 | | | 6 | 6 | 6 | | | 6 | 6 | 6 |

FIG. 13b

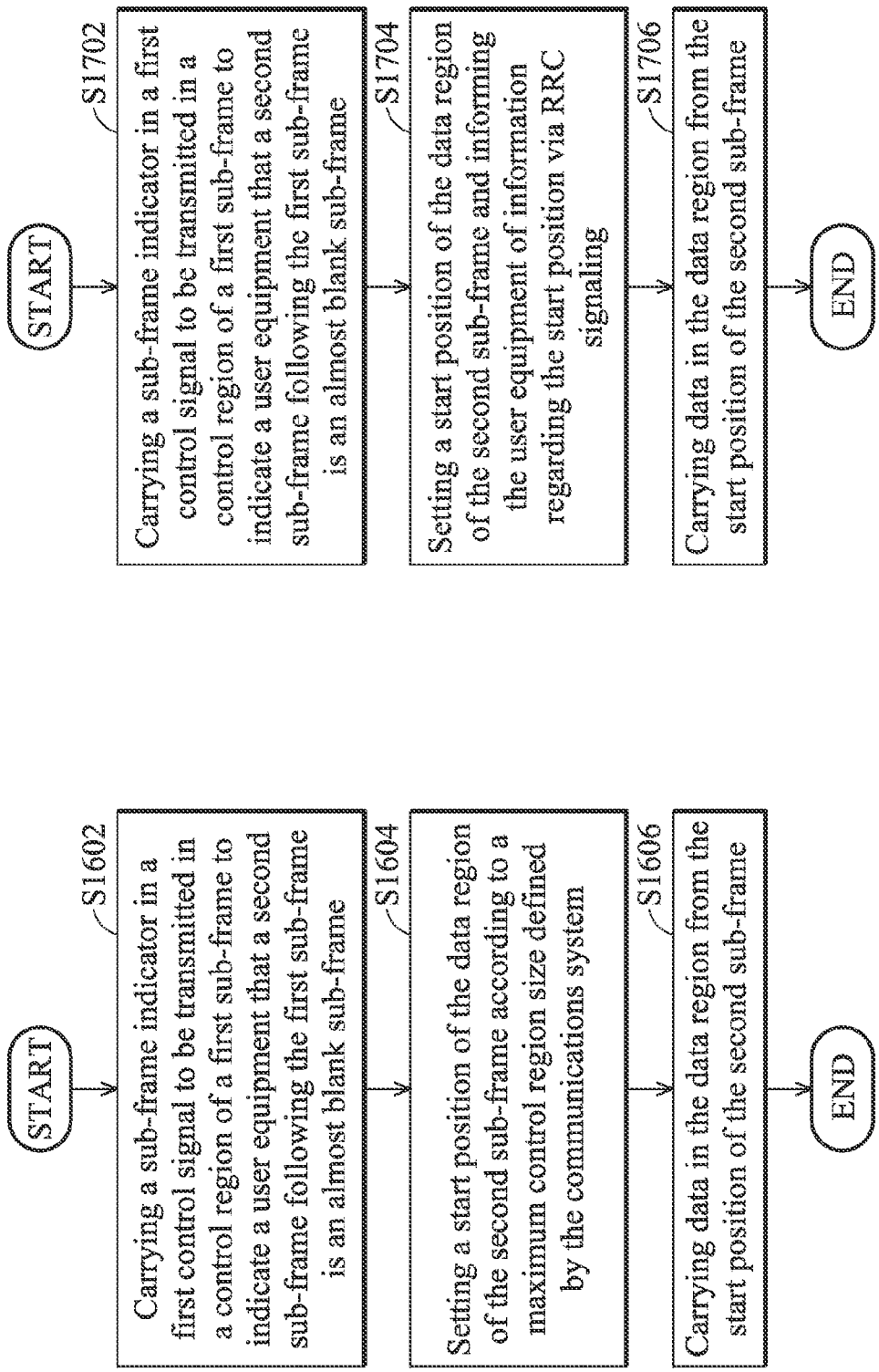

METHOD FOR COORDINATING TRANSMISSIONS BETWEEN DIFFERENT COMMUNICATIONS APPARATUSES AND COMMUNICATION SAPPARATUSES UTILIZING THE SAME

CROSS REFERENCE TO RELATED APPLICATIONS

This application is a Continuation of pending U.S. application Ser. No. 13/164,324, filed on Jun. 20, 2011, which claims the benefit of U.S. Provisional Application No. 61/356,090 filed 2010 Jun. 18 and entitled "INTERCELL INTERFERENCE COORDINATION OF DOWNLINK CONTROL CHANNELS IN LTE HETEROGENEOUS NETWORK OF MACRO PLUS HOME ENODEBS DEPLOYMENT", U.S. Provisional Application No. 61/356,092, filed 2010 Jun. 18 and entitled "INTERFERENCE MITIGATION IN HETEROPENEOUS NETWORKS", U.S. Provisional Application No. 61/356,727, filed 2010 Jun. 21 and entitled "INTERCELL INTERFERENCE COORDINATION IN A HETEROGENEOUS NETWORK BY SUB-FRAMES MUTING AN INTERFERENCE REPORT", U.S. Provisional Application No. 61/388,681, filed 2010 Oct. 1 and entitled "INTER-CELL INTERFERENCE COORDINATION WITHOUT BAKHAUL SIGNALING BETWEEN MACRO AND FEMTO ENBS" and U.S. Provisional Application No. 61/408,868, filed 2010 Nov. 1 and entitled "DESIGN OF ALMOST BLANK SUBFRAME (ABS) PATTERN IN FDD AND TDD COMMUNICATIONS SYSTEM". The entire contents of which are hereby incorporated by reference.

BACKGROUND OF THE INVENTION

1. Field of the Invention

The invention relates to a wireless network communications, and more particularly to uplink/downlink transmission coordination between different cells to avoid inter-cell interference in wireless communications systems.

2. Description of the Related Art

Due to mobile communication technology advancements in recent years, various communications services, such as voice call services, data transfer services, and video call services, etc., may be provided to users regardless of their locations. Most mobile communications systems are multiple access systems in which access and wireless network resources are allocated to multiple users. The multiple access technologies employed by the mobile communications systems include the 1× Code Division Multiple Access 2000 (1× CDMA 2000) technology, the 1× Evolution-Data Optimized (1× EVDO) technology, the Orthogonal Frequency Division Multiplexing (OFDM) technology, and the Long Term Evolution (LTE) technology. Evolved from the LTE, the LTE Advanced is a major enhancement of the LTE standard. The LTE Advanced should be compatible with LTE equipment, and should share frequency bands with the LTE communications system. One of the important LTE Advanced benefits is its ability to take advantage of advanced topology networks, wherein optimized heterogeneous networks have a mix of macros with low power nodes such as picocells, femtocells and new relay nodes.

FIG. 1 shows an exemplary heterogeneous network (HetNet) deployment. Within the coverage area 100 of a macro evolved node B (eNB) 101, several low power nodes having smaller coverage areas are deployed so as to improve the overall system capacity. As shown in the figure, a pico eNB (also called a picocell) 102, a femto eNB (also called a femtocell) 103 and a relay eNB 104 are deployed with the coverage area 100 of the macro eNB 101. However, such HetNet deployment may cause undesired inter-cell interference. For example, suppose that the user equipment (UE) 202 camps on the pico eNB 102 as a serving cell. When the UE 202 moves to the cell edge of pico eNB 102, the signal transmitted by the macro eNB 101 adjacent to the UE 202 may become a strong interference to the UE 202 since the power of the signal transmitted by the pico eNB 102 may be weak when the signal reaching the UE 202. For another example, when a UE 201 not belong to the closed subscriber group (CSG) of the femto eNB 103 moves to the coverage area thereof, the signal transmitted by the femto eNB 103 may also become a strong interference to the UE 201. For yet another example, the signal transmitted by the macro eNB 101 may also be an interference to the UE 203 when the relay eNB 104 is transmitting signal or data to the UE 203 at the same time.

In order to solve the above-mentioned problems, methods and apparatus for uplink/downlink transmission coordination between different cells to avoid inter-cell interference in wireless Orthogonal Frequency Division Multiple Access (OFDMA) communications systems are provided.

BRIEF SUMMARY OF THE INVENTION

Communications apparatuses and methods for coordinating transmissions between different communications apparatuses are provided. An embodiment of a communication apparatus comprises a controller module and a radio frequency (RF) module. The controller module generates a suggested sub-frame pattern describing suggested arrangement of one or more almost blank sub-frame(s) in one or more frame(s) and schedules control signal and/or data transmissions according to the suggested sub-frame pattern. The radio frequency module transmits at least a first signal carrying information regarding the suggested sub-frame pattern to a peer communications apparatus. The peer communications apparatus does not schedule data transmissions in the almost blank sub-frame(s).

Another embodiment of a communications apparatus comprises a controller module and a radio frequency (RF) module. The controller module generates a predetermined sub-frame pattern describing arrangement of one or more almost blank sub-frame(s) in one or more frame(s) and schedules control signal and/or data transmissions according to the predetermined sub-frame pattern. The controller module does not schedule data transmission in the almost blank sub-frame(s). The RF module transmits at least a first signal carrying information regarding the predetermined sub-frame pattern to a peer communications apparatus.

An embodiment of a method for coordinating transmissions between different communications apparatus comprises: generating a predetermined sub-frame pattern describing arrangement of one or more almost blank sub-frame(s) in one ore more frame(s); informing at least a peer communications apparatus about the predetermined sub-frame pattern; and scheduling control signal and/or data transmissions according to the predetermined sub-frame pattern.

Another embodiment of a communications apparatus comprises a controller module and a radio frequency (RF) module. The controller module obtains information regarding a Hybrid Automatic Repeat Request (HARQ) round trip time (RTT) in an HARQ process, arranges one or more almost blank sub-frame(s) in one or more frame(s) according to the HARQ RTT information and generates a sub-frame pattern describing the arrangement of the almost blank sub-frame(s).

The HARQ RTT is defined by the communications system. The RF module transmits at least a signal carrying information regarding the sub-frame pattern to a peer communications apparatus in the communications system.

Another embodiment of a method for coordinating transmissions between different communications apparatus comprises: obtaining information regarding a Hybrid Automatic Repeat Request (HARQ) round trip time (RTT) in an HARQ process defined by the communications system; and arranging one or more almost blank sub-frame(s) in one or more frame(s) according to the HARQ RTT.

Another embodiment of a method for coordinating transmissions between different communications apparatus comprises: obtaining a sub-frame indicator carried in a first control signal transmitted in a control region of a first sub-frame received from an evolved node B (eNB), wherein the sub-frame indicator indicates resource allocation of one or more sub-frame following the first sub-frame; determining whether a second sub-frame following the first sub-frame and received from the eNB is an almost blank sub-frame according to the sub-frame indicator; and when the second sub-frame is not the almost blank sub-frame, obtaining information regarding a start position of a data region of the second sub-frame from a second control signal transmitted in a control region of the second sub-frame.

Another embodiment of a method for coordinating transmissions between different communications apparatus comprises carrying a sub-frame indicator in a first control signal to be transmitted in a control region of a first sub-frame to indicate a user equipment whether a second sub-frame following the first sub-frame is an almost blank sub-frame.

Another embodiment of a method for a communications system to assign an Almost Blank Sub-frame (ABS) pattern comprises: collecting one or more neighbor eNB(s)'s information; identifying at least one victim eNB which serves one or more UE(s) interfered by the communications system based on the collected neighbor eNB(s)'s information; and assigning the ABS pattern to the victim eNB such that an interference within a cell of the victim eNB is reduced.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 3 shows downlink radio resource allocations utilized according to an embodiment of the invention;

FIG. 8 is a table showing the TDD uplink/downlink (UL/DL) configurations in the communications system according to an embodiment of the invention;

FIG. 9a shows the values of HARQ parameter k1 in TDD UL/DL configurations 1-6 according to an embodiment of the invention;

FIG. 9b shows the values of HARQ parameter k2 in TDD UL/DL configurations 1-6 according to an embodiment of the invention;

FIG. 12a shows a first arrangement of values of HARQ parameter k1 in TDD UL/DL configuration 0 according to an embodiment of the invention;

FIG. 12b shows a second arrangement of values of HARQ parameter k1 in TDD UL/DL configuration 0 according to another embodiment of the invention;

FIG. 13a shows a first arrangement of values of HARQ parameter k2 in TDD UL/DL configuration 0 according to an embodiment of the invention;

FIG. 13b shows a second arrangement of values of HARQ parameter k2 in TDD UL/DL configuration 0 according to another embodiment of the invention;

FIG. 16 is a flow chart showing a method for cross sub-frame scheduling for ABS according to a first embodiment of a third aspect of the invention;

FIG. 17 is a flow chart showing a method for cross sub-frame scheduling for ABS according to a second embodiment of a third aspect of the invention;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
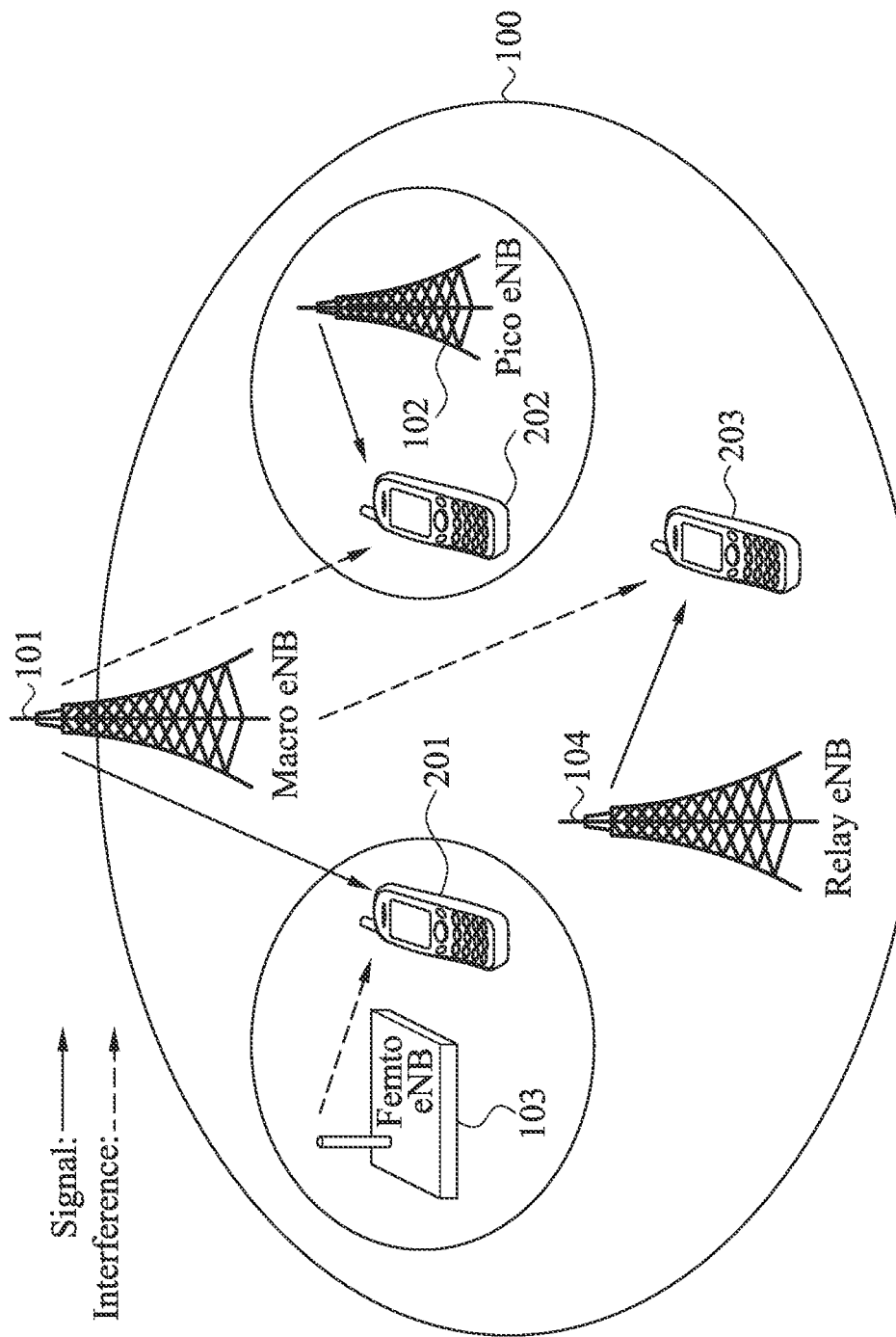
FIG. 1 shows an exemplary heterogeneous network (HetNet) deployment.
Figure 2B:
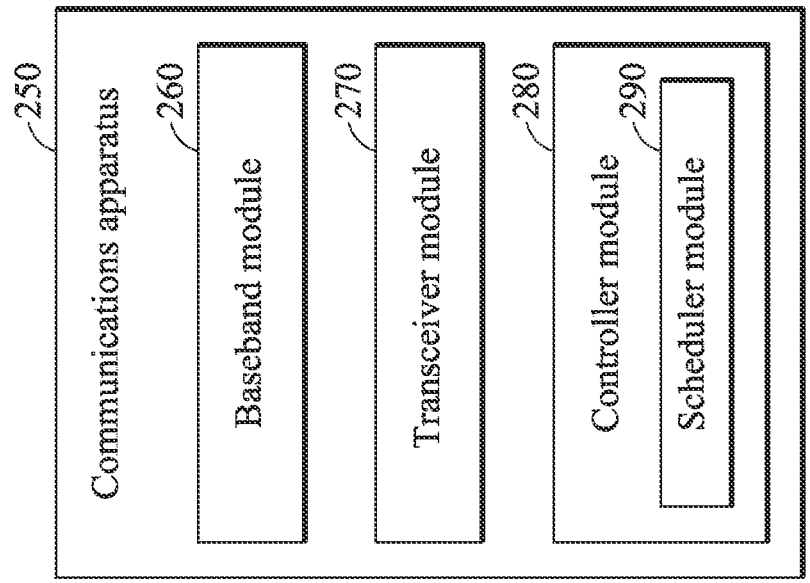
FIG. 2b a is a block diagram illustrating a communications apparatus according to an embodiment of the invention.
Figure 2A:
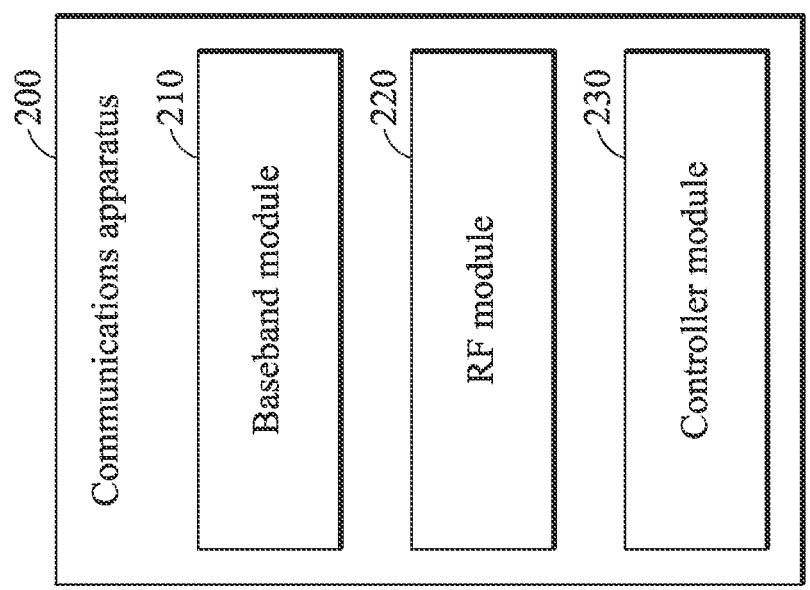
FIG. 2a is a block diagram illustrating a communications apparatus according to an embodiment of the invention.

FIG. 2a is a block diagram illustrating a communications apparatus according to an embodiment of the invention. The communications apparatus 200 may be an User Equipment (UE) in the service network as shown in FIG. 1. The operations of the service network may be in compliance with a communication protocol. In one embodiment, the service network may be a Long Term Evolution (LTE) system or an LTE Advanced system. The communications apparatus 200 may comprise at least a baseband module 210, a Radio Frequency (RF) module 220 and a controller module 230. The baseband module 210 may comprise multiple hardware devices to perform baseband signal processing, including Analog to Digital Conversion (ADC)/Digital to Analog Conversion (DAC), gain adjusting, modulation/demodulation, encoding/decoding, and so on. The RF module 220 may receive RF wireless signals, convert the received RF wireless signals to baseband signals, which are processed by the baseband module 210, or receive baseband signals from the baseband module 210 and convert the received baseband signals to RF wireless signals, which are later transmitted. The RF module 220 may also comprise multiple hardware devices to perform radio frequency conversion. For example, the RF module 220 may comprise a mixer to multiply the baseband signals with a carrier oscillated in the radio frequency of the wireless communications system, wherein the radio frequency may be 900 MHz, 1900 MHz, or 2100 MHz utilized in Universal Mobile Telecommunications System (UMTS) systems, or may be 900 MHz, 2100 MHz, or 2.6 GHz utilized in the LTE systems, or others depending on the radio access technology (RAT) in use. The controller module 230 controls the operation of the baseband module 210 and RF module 220 and other functional components, such as a display unit and/or keypad serving as the MMI (man-machine interface), a storage unit storing data and program codes of applications or communication protocols, or others. In addition to the UMTS system and the LTE system, it is to be understood that the invention may be applied to any future RATs.

FIG. 2b is a block diagram illustrating a communications apparatus according to another embodiment of the invention. The communications apparatus 250 may be an evolved node B (eNB) in the service network as shown in FIG. 1. The communications apparatus 250 may comprise at least a baseband module 260, a transceiver module 270 and a controller module 280. The transceiver module 270 may transmit and receive signals via wireless or wired manner. Noted that according to the embodiment of the invention, the eNB may transmit control or/and data signal(s) to one or more UEs and communicate with other eNBs via wireless or wired connection. For example, the transceiver module 270 may comprise a RF module or directly act as RF module, and the operations of the RF module are similar to the RF module 220 in FIG. 2a. In some embodiments, the transceiver module may communicate with other eNBs via backhaul connection. The operations of the baseband module 260 and the controller module 280 are similar to that of the baseband module 210 and the controller module 230 as shown in FIG. 2a. Therefore, the detailed descriptions of the baseband module 260 and the controller module 280 may refer to that of the baseband module 210 and the controller module 230 as described above, and are omitted here for brevity. Note that according to the embodiment of the invention, because the eNB is responsible for serving one or more UEs in the serving network, the controller module 280 may further schedule control signal and data transmissions for transmitting control signals and data to the UE(s) in the serving network. For example, the controller module 280 may comprise a scheduler module 290, which is arranged to schedule the control signal and data transmissions. Note that in some embodiments, the transmission scheduling may be directly performed by the controller module 280. Therefore, a dedicated scheduler module 290 may an optional choice based on different design requirements, and the invention should not be limited what is shown in FIG. 2b. Note also that the controller module 230/280 may also be integrated into the baseband module 210/260, depending on different design requirements, and the invention should not be limited what is shown in FIG. 2a and FIG. 2b.

FIG. 3 shows downlink radio resource allocations according to an embodiment of the invention. Here, downlink means the signals are transmitted from an eNB to an UE. As shown in FIG. 3, a downlink sub-frame 300 is composed of a control region 301 and a data region 302. In the data region 302, data signals of different UEs are transmitted in different sub-bands (i.e. by using different sub-carriers), where each bar in the figure represents a frequency sub-band. However, in the control region, control signals of different UEs are transmitted over the full downlink band. When downlink control signals are simultaneously transmitted by adjacent eNBs in the heterogeneous network as shown in FIG. 1, the important downlink control signals transmitted by one eNB may suffer the interference from another eNB and therefore, inter-cell interference happens. To solve the problems, several methods for uplink/downlink transmission coordination between different cells to avoid inter-cell interference in wireless communications systems and the communications apparatus thereof are provided.

Referring back to FIG. 1, as previously described, the signal transmitted by the macro eNB 101 adjacent to the UE 202 may become a strong interference to the UE 202 when the UE 202 moves to the cell edge of pico eNB 102. In this case, the macro eNB 101 may be regarded as an aggressor eNB, the UE 202 may be regarded as a victim UE and the pico eNB 102 may be regarded as a victim eNB since the downlink signal transmitted by the pico eNB 102 may be interfered by the downlink signal transmitted by the macro eNB 101. Similarly, for the case when downlink signal transmitted by the femto eNB 103 to interfere with the downlink signal transmitted by the macro eNB 101, the femto eNB 103 may be regarded as an aggressor eNB, the UE 201 may be regarded as a victim UE and the macro eNB 101 may be regarded as a victim eNB. Further, for the case when downlink signal transmitted by the macro eNB 101 to interfere with the downlink signal transmitted by the relay eNB 104, the macro eNB 101 may be regarded as an aggressor eNB, the UE 203 may be regarded as a victim UE and the relay eNB 104 may be regarded as a victim eNB.

Figure 4:
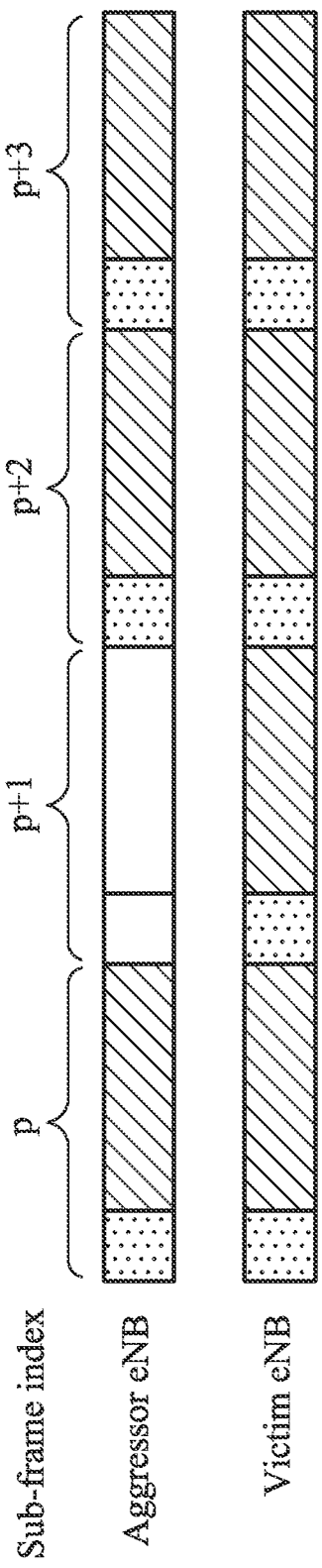
FIG. 4 shows a downlink sub-frame arrangement between an aggressor eNB and a victim eNB to avoid inter-cell interference according to a concept of the invention.

FIG. 4 shows a downlink sub-frame arrangement between an aggressor eNB and a victim eNB to avoid inter-cell interference according to a concept of the invention. In the embodiment, the aggressor eNB may blank one or more sub-frame(s) in one or more frame(s) for victim eNBs so that the victim eNBs may schedule the control signal and/or data transmissions to transmit the control signal and/or data to the victim UE in the corresponding sub-frames. Generally, one frame may comprise 10 sub-frames, and one sub-frame has duration of 1 ms and comprises 14 OFDM symbols. The victim UEs are those suffer interference from the aggressor eNB. The sub-frame blanked by the aggressor eNB is called an almost blank sub-frame (ABS). In the ABS, the aggressor eNB may not schedule data transmission, and only schedule fewer control signal transmissions than in a normal sub-frame. Because data transmission is not scheduled in the ABS, the control signals to be transmitted in the ABS can be fewer than that have to be transmitted in a normal sub-frame. For example, in the ABS, the Physical Control Format Indicator Channel (PCFICH) control signals and Physical Downlink Control Channel (PDCCH) control signals and are not transmitted, where the PCFICH control signal is utilized to specify how many OFDM symbols are used to transmit the control channels so the receiver UE knows where to find control information, and the PDCCH control signal is utilized to specify resource allocation and modulation and coding scheme of the data signals (to be transmitted in the data region). The control signals that are still transmitted in the control region of an ABS may comprise, for example and not limited to, the common control signals (such as a common reference signal (CRS), synchronization signal, system information . . . etc.) and paging signal.

As shown in FIG. 4, the (p+1)-th sub-frame is arranged by the aggressor eNB as an ABS. Therefore, the victim eNB may schedule the control signal and/or data transmissions of the victim UE in the (p+1)-th sub-frame. The victim eNB may obtain information regarding which UE(s) connected thereto is/are the victim UE according to, for example and not limited to, the measurement report provided by the UE(s). To be more specific, if the measurement report shows that the power of signals received from a non-serving eNB have exceed a predetermined threshold, the UE may be regarded as a victim UE. In the following paragraphs, three aspects of the invention will be introduced. According to a first aspect of the invention, methods for coordinating the sub-frame pattern which describes the arrangement of one or more ABS(s) and the communications apparatuses utilizing the same are provided.

According to an embodiment of the invention, the controller module (such as the controller module 280) of an aggressor eNB may first generate a predetermined sub-frame pattern, which describes predetermined arrangement of one or more ABS(s) in one or more frame(s), and inform at least a victim eNB about the predetermined sub-frame pattern by transmitting at least a first signal carrying information regarding the predetermined sub-frame pattern to the victim eNB via the transceiver module (such as the transceiver module 270). Note that in this case, the informed victim eNB may be regarded as a peer communications apparatus with respect to the aggressor eNB. The controller module (or the scheduler module 290) of the aggressor eNB may further schedule control signal and/or data transmissions according to the predetermined sub-frame pattern. As previously described, the aggressor eNB may not schedule data transmission in the ABS(s), and may schedule fewer control signal transmissions in the ABS(s) than in normal sub-frames as previously described.

For the victim eNB, after receiving the first signal from the aggressor eNB, the controller module (such as the controller module 280) of the victim eNB may further generate a suggested sub-frame pattern describing suggested arrangement of one or more ABS(s) based on the predetermined sub-frame pattern, and report the suggested sub-frame pattern to the aggressor eNB via the transceiver module (such as the transceiver module 270). Note that in this case, the aggressor eNB may be regarded as a peer communications apparatus with respect to the victim eNB. The controller module of the victim eNB may transmit a second signal carrying information regarding the suggested sub-frame pattern to the aggressor eNB via the transceiver module. According to an embodiment of the invention, the suggested sub-frame pattern is a subset of the predetermined sub-frame pattern, and the controller module (or the scheduler module 290) of the victim eNB may schedule control signal and/or data transmissions according to the suggested sub-frame pattern. The predetermined sub-frame pattern and suggested sub-frame pattern may be represented as a bit-string which comprises a plurality of bits, where each bit is utilized to describe whether a corresponding sub-frame is an almost blank sub-frame (ABS) or a normal sub-frame. For example, the predetermined sub-frame pattern may be {11000000}, where the '1' indicates that the corresponding sub-frame is an ABS, and the '0' indicates that the corresponding sub-frame is a normal sub-frame. The suggested sub-frame pattern determined by the victim eNB may be {10000000}, which is an subset of the predetermined sub-frame pattern.

According to another embodiment of the invention, the victim eNB may also carry information regarding a number of suggested (or useful) ABS(s), or a ratio of the number of suggested (or useful) ABS(s) to a number of total ABS(s) arranged in the predetermined sub-frame pattern in the second signal. Note that in yet some embodiments of the invention, the victim eNB may also directly generate the suggested sub-frame pattern according to information collected from the served UEs (for example, which UE(s) in the service network is/are the victims and which sub-frame(s) is/are utilized to transmit important control signals to the victim UE(s)) without receiving the predetermined sub-frame pattern in advance, and provide the suggested sub-frame pattern to the aggressor eNB. In this manner, in the suggested ABS(s), the aggressor eNB is suggested to schedule only a fewer of necessary control signal transmissions, and no data transmissions.

Note that in the invention, the sub-frame pattern may be semi-statically updated. As previously described, the victim eNB may report a number of suggested (or useful) ABS(s), a ratio of the number of suggested (or useful) ABS(s) to a number of total ABS(s) arranged in the predetermined sub-frame pattern, and/or the suggested sub-frame pattern to the aggressor eNB (hereinafter called the reported information) when the predetermined sub-frame pattern is not appropriate for the victim eNB. For example, when the ratio of the number of suggested (or useful) ABS(s) to a number of total ABS(s) arranged in the predetermined sub-frame pattern reported by the victim eNB approaches 1, it means that the number of total ABS(s) arranged in the predetermined sub-frame pattern may be not enough for the victim eNB to arrange the control signal and/or data transmissions for the victim UEs. The aggressor eNB may collect the reported information from its neighboring eNBs where neighboring eNBs is the eNB in the aggressor eNB's cell coverage or the eNB of its neighboring cell, and update the predetermined sub-frame pattern based on the collected reported information to obtain an updated sub-frame pattern.

The aggressor eNB may further transmit at least a third signal carrying information regarding the updated sub-frame pattern to its neighboring eNB(s). Note that in this case, the victim eNB may be regarded as a peer communications apparatus with respect to the aggressor eNB. Both the aggressor eNB and the victim eNB(s) may schedule the control signal and/or data transmissions according to the updated sub-frame pattern. According to an embodiment, the predetermined, suggest and updated sub-frame patterns may be transmitted in compliance with X2 protocol. The X2 protocol is defined by the communications system for establishing communications between different eNBs. According to another embodiment, the predetermined, suggest and updated sub-frame patterns may be transmitted via the air interface in compliance with the protocol defined by the RAT in use. The air interface is the wireless transmission path established the UE and the eNB or between the relay eNB and macro eNB.

Figure 5:
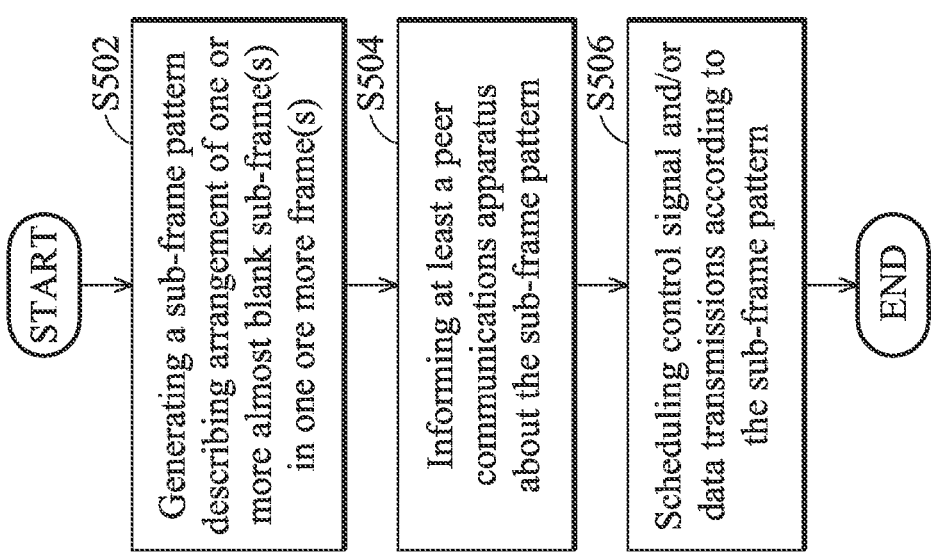
FIG. 5 is a flow chart showing a method for coordinating transmissions between different communications apparatuses according to a first aspect of the invention.

FIG. 5 is a flow chart showing a method for coordinating transmissions between different communications apparatuses according to the first aspect of the invention. The eNB (either an aggressor or a victim eNB) may first generate a sub-frame pattern describing arrangement of one or more almost blank sub-frame(s) in one or more frame(s) (Step S502), and the sub-frame pattern may be the above-mentioned predetermined, suggested or updated sub-frame pattern generated by the aggressor or victim eNB. Next, the eNB may inform at least a peer communications apparatus (for example, a peer aggressor or victim eNB, depending on whether the sub-frame pattern is generated by the victim eNB or the aggressor eNB) about the sub-frame pattern (Step S504). As previously described, the eNB may inform the peer communications apparatus by transmitting a signal carrying information regarding the sub-frame pattern. Note that in some embodiments of the invention, the eNB (either the aggressor or the victim eNB) may also carry information regarding a frame and/or sub-frame index offset to indicate from which frame and/or sub-frame should the sub-frame pattern begin to be applied. Finally, the eNB may schedule control signal and/or data transmissions according to the sub-frame pattern (Step S506). For example, in some embodiments of the invention, the eNB may schedule fewer control signal transmissions and no data transmissions in the ABS(s).

According to a second aspect of the invention, methods for determining sub-frame index (indices) of one or more ABS(s) and the communications apparatuses utilizing the same are provided. According to an embodiment of the invention, because synchronous Hybrid Automatic Repeat Request (HARQ) transmission scheme is adopted in the communications system for error correction, the sub-frame index (indices) of the ABS(s) is preferably determined with consideration of the completeness of an HARQ process. Typically, the communications apparatus can transmit/retransmit the HARQ messages in a periodic manner where consecutive HARQ messages are spaced by about a round trip time (RTT) delay. The HARQ messages may comprise an uplink grant message and an acknowledgement (ACK)/negative acknowledgement message (NACK) (which will be discussed in more detailed in the following paragraphs). An HARQ process may begin when the uplink grant message is transmitted, and end when an ACK/NACK message is transmitted. The time span between the transmissions of the uplink grant message and the ACK/NACK message defines the HARQ round trip time.

Figure 6:
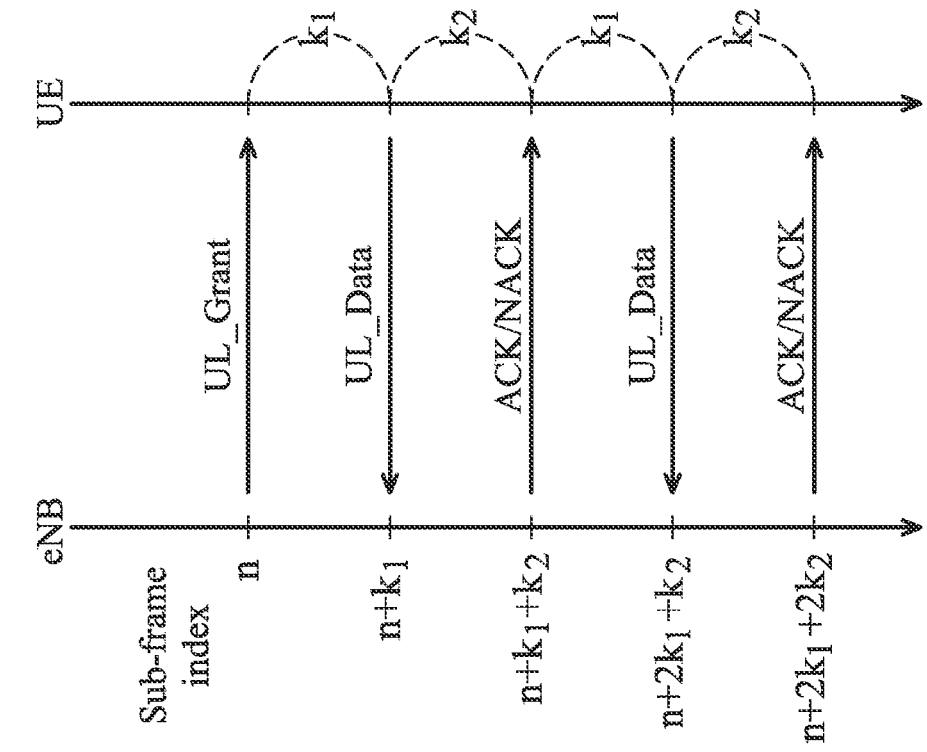
FIG. 6 is a message flow showing the HARQ process according to an embodiment of the invention.

FIG. 6 is a message flow showing the HARQ process according to an embodiment of the invention. Suppose that a sub-frame offset between an uplink grant message transmission and uplink data transmission is defined by communications system as the k1, and a sub-frame offset between the uplink data transmission and an acknowledgment (ACK) or a negative acknowledgment (NACK) message transmission is defined by communications system as the k2, the HARQ RTT is (k1+k2). Therefore, as shown in FIG. 6, the eNB may transmit the uplink grant message (the UL_Grant as shown) to the UE in the n-th sub-frame, wherein n is a non-negative integer. After receiving the UL grant message, the UE may transmit the uplink data (the UL_Data as shown) to the eNB in the (n+k1) th sub-frame. The eNB may further transmit the ACK/NACK message (the ACK/NACK as shown) in the (n+k1+k2) th sub-frame for informing the UE about whether uplink data have been received or not. When the uplink data is not received (i.e. an NACK message is transmitted by the eNB), or when there is still some uplink data have to be transmitted, the UE may further retransmit or transmit the uplink data to the eNB in the (n+2k1+k2) th sub-frame. The eNB may further transmit the ACK/NACK message in the (n+2k1+2k2) th sub-frame for informing the UE about whether uplink data have been received or not.

According to an embodiment of the invention, because the uplink grant message and the ACK/NACK message are important control signals to be transmitted in the control region (such as the control region 301 as shown in FIG. 3), the controller module (such as the controller module 280) of an eNB (either an aggressor or a victim eNB) may arrange one or more ABS(s) in one or more frame(s) according to the HARQ RTT in an HARQ process and, as previously described, generate a sub-frame pattern describing the arrangement of the ABS(s). For example, the ABS(s) in the sub-frame pattern may be arranged according to a transmission period of the uplink grant message and the ACK/NACK message.

To be more specific, when the HARQ RTT is defined by (k1+k2) sub-frames, the controller module (such as the controller module 280) may arrange the almost blank sub-frame(s) in the following rule:

Given n and m are non-negative integers, when n-th is almost blank sub-frame, [n+m*(k1+k2)]-th sub-frame(s) are almost blank sub-frame.

Note that based on the concept of the invention, at least one ABS in the sub-frame pattern is arranged in a sub-frame utilized by a victim eNB to transmit an uplink grant message for granting a victim UE who want to transmit uplink data thereto, and/or at least one ABS in the sub-frame pattern is arranged in a sub-frame utilized by the victim eNB to transmit an ACK/NACK message for informing the victim UE about whether the uplink data transmitted by the victim UE in response to the received uplink grant message have been received by victim eNB. Therefore, the victim eNB and the victim UE can successfully complete an HARQ process without being interfered by the aggressor eNB.

For example, suppose that in a frequency division duplex (FDD) mode (that is, the uplink and downlink data are transmitted in different frequency bands in an FDD manner), it is defined by the LTE system that k1=4 and k2=4. Therefore, in a preferred embodiment, the aggressor eNB may blank the (n+m*8)-th sub-frame(s) to avoid inter-cell interference when n-th subframe is assigned as an almost blank sub-frame.

Figure 7:
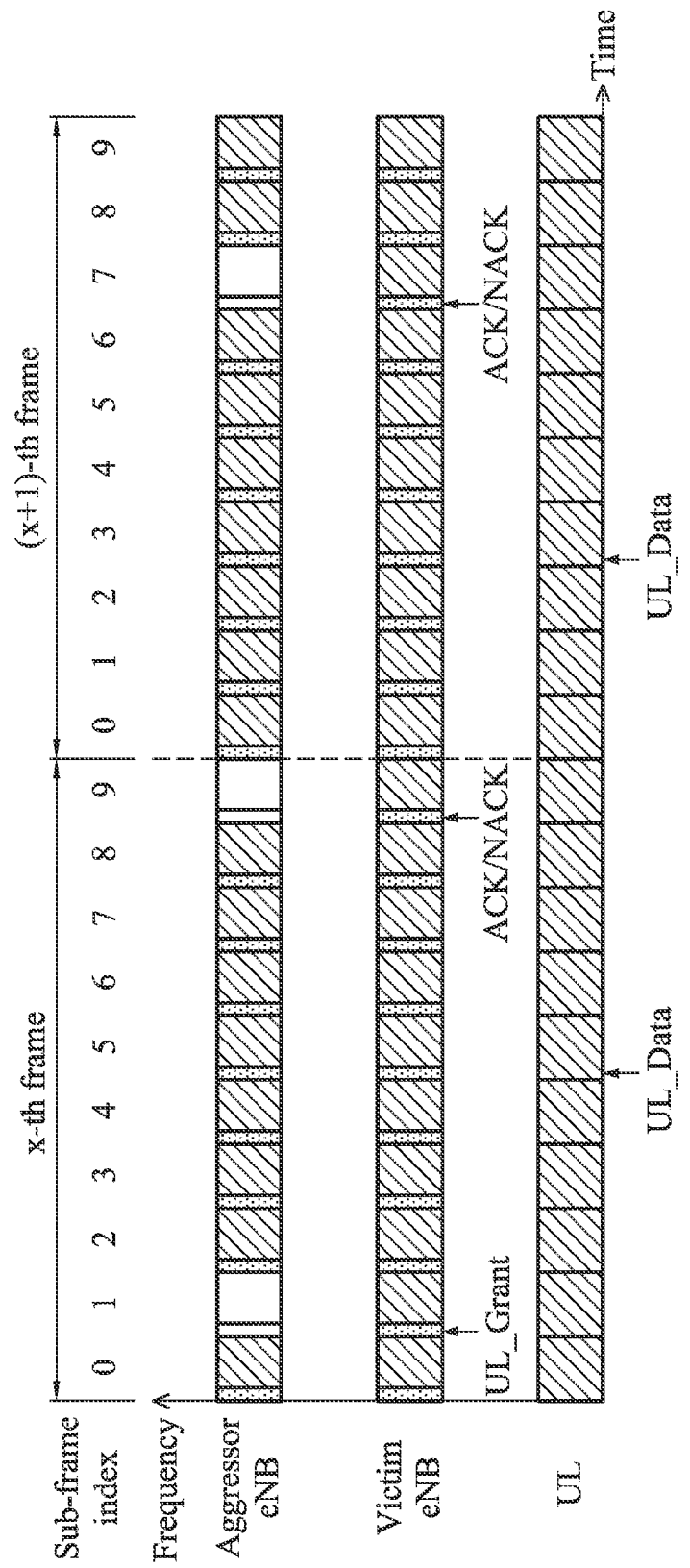
FIG. 7 shows an exemplary arrangement of several ABSs scheduled by an aggressor eNB and the corresponding HARQ messages scheduled by a victim eNB according to an embodiment of the invention.

FIG. 7 shows an exemplary arrangement of several ABSs scheduled by an aggressor eNB and the corresponding HARQ messages scheduled by a victim eNB according to an embodiment of the invention. As shown in FIG. 7, the aggressor eNB blanks the first and the 9-th sub-frame in the x-th frame and the 7-th sub-frames in the (x+1)-th frame as the almost blank sub-frames. Therefore, the sub-frame index offset between the ABSs would be a multiple of 8 (that is, a multiple of (k1+k2)). The victim eNB may transmit an uplink grant message UL_Grant in the first sub-frame in the x-th frame, and receive the uplink data UL_Data from the UE in the 5-th sub-frame in the x-th frame. The victim eNB may further transmit an acknowledge message ACK/NACK in the 9-th sub-frame in the x-th frame, receive the uplink data UL_Data from the UE in the third sub-frame in the (x+1)-th frame, and transmit an acknowledge message ACK/NACK in the 7-th sub-frames in the (x+1)-th frame. Because the uplink grant message UL_Grant and the acknowledge message ACK/NACK are transmitted during the ABS interval arranged by the aggressor eNB, the uplink grant message and the acknowledge message can be transmitted without being interfered.

According to another embodiment of the invention, the controller module may also arrange the almost blank sub-frame(s) in the [n+m*(k1+k2)]-th sub-frame(s) when the n-th sub-frame is assigned as an almost blank sub-frame while operating in a time division duplex (TDD) mode (that is, the uplink and downlink data are transmitted in a TDD manner in the same frequency band). FIG. 8 is a table showing the TDD uplink/downlink (UL/DL) configurations in the communications system according to an embodiment of the invention. As shown in the table, the letter 'D' represents that the corresponding sub-frame is a downlink sub-frame, the letter 'U' represents that the corresponding sub-frame is a uplink sub-frame, and the letter 'S' represents that the corresponding sub-frame is a special sub-frame. Note that the fore-portion of the special sub-frame is utilized for downlink transmission, the later-portion of the special sub-frame is utilized for uplink transmission, and a silence region is arranged in the middle of the special sub-frame between the downlink and uplink transmissions. As shown in FIG. 8, there are seven kinds of configurations defined by the communications system, each having different ratios of uplink sub-frame number to downlink frame number.

For different UL/DL configurations, the HARQ parameters k1 and k2 are different. FIG. 9a shows the values of HARQ parameter k1 in TDD UL/DL configurations 1-6 according to an embodiment of the invention, and FIG. 9b shows the values of HARQ parameter k2 in TDD UL/DL configurations 1-6 according to an embodiment of the invention. Note that the numbers shown in the table in FIG. 9a are values of the corresponding parameter k1 set for different sub-frame index, and the numbers shown in the table in FIG. 9b are values of the corresponding parameter k2 set for different sub-frame index.

Take the TDD UL/DL configuration 1 shown in the table in FIG. 9a as an example, when an uplink grant message is transmitted by the eNB in the first sub-frame, the HARQ parameter k1=6, which means that the UE receiving the uplink grant message in the first sub-frame can uplink data after six sub-frames (that is, the uplink data will be transmitted in the 7-th sub-frame because 1+6=7). Referring now to FIG. 9b, when the uplink data is transmitted in the 7-th sub-frame, the HARQ parameter k2=4, which means that the eNB, that is supposed to receive the uplink data in the 7-th sub-frame, is responsible for transmitting the ACK/NCAK message after four sub-frames (that is, the ACK/NCAK message will be transmitted in the first sub-frame of a next frame because [(7+4) mod 10]=1).

Similarly, take the TDD UL/DL configuration 4 shown in the table in FIG. 9a as an example, when an uplink grant message is transmitted by the eNB in the eighth sub-frame, the HARQ parameter k1=4, which means that the UE receiving the uplink grant message in the eighth sub-frame can uplink data after four sub-frames (that is, the uplink data will be transmitted in the second sub-frame of a next frame because [(8+4)mod 10]=2). Referring now to FIG. 9b, when the uplink data is transmitted in the second sub-frame, the HARQ parameter k2=6, which means that the eNB that is supposed to receive the uplink data in the second sub-frame is responsible for transmitting the ACK/NCAK message after six sub-frames (that is, the ACK/NCAK message will be transmitted in the eighth sub-frame because 2+6=8).

Therefore, in TDD mode, the controller module may also arrange the almost blank sub-frame(s) in the [n+m*(k1+k2)]-th sub-frame(s) when n-th sub-frame is assigned as an almost blank sub-frame according to the tables as shown in FIG. 9a and FIG. 9b. Note that for the TDD UL/DL configurations 1-5, it always takes one frame to complete an HARQ process (that is, (k1+k2)=10 sub-frames=1 frame). In other words, for the TDD UL/DL configurations 1-5, the offset between the UL grant message transmission and the ACK/NACK message transmission is one frame. Therefore, the controller module may arrange the ABS(s) in a fixed location in each frame so that a sub-frame index of the arranged ABS(s) can fixed in different frames.

Figure 10:
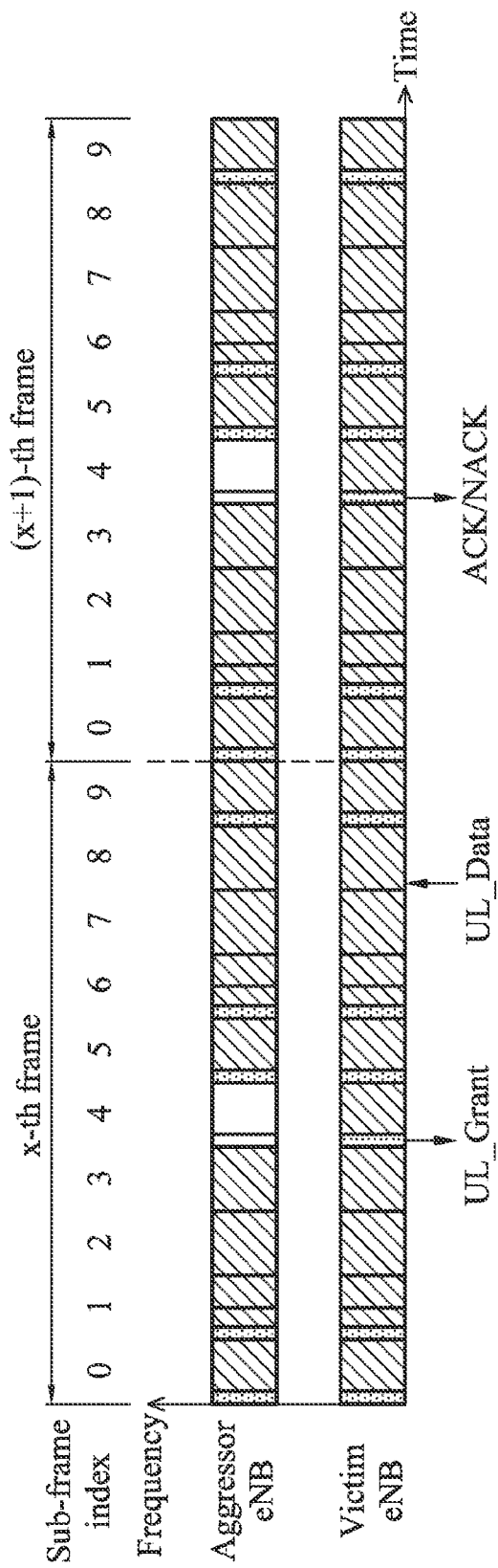
FIG. 10 shows an exemplary arrangement of several ABSs scheduled by an aggressor eNB and the corresponding HARQ messages scheduled by a victim eNB according to another embodiment of the invention.

FIG. 10 shows an exemplary arrangement of several ABSs scheduled by an aggressor eNB and the corresponding HARQ messages scheduled by a victim eNB according to another embodiment of the invention. In the embodiment, TDD UL/DL configuration 1 is taken as an example, and the ABSs are arranged by the aggressor eNB in the fourth sub-frame in each frame. Therefore, the victim eNB may transmit an uplink grant message UL_Grant in the fourth sub-frame in the x-th frame and transmit an acknowledge message ACK/NACK in the fourth sub-frame in the (x+1)-th frame to avoid being interfered by the aggressor eNB.

Figure 11:
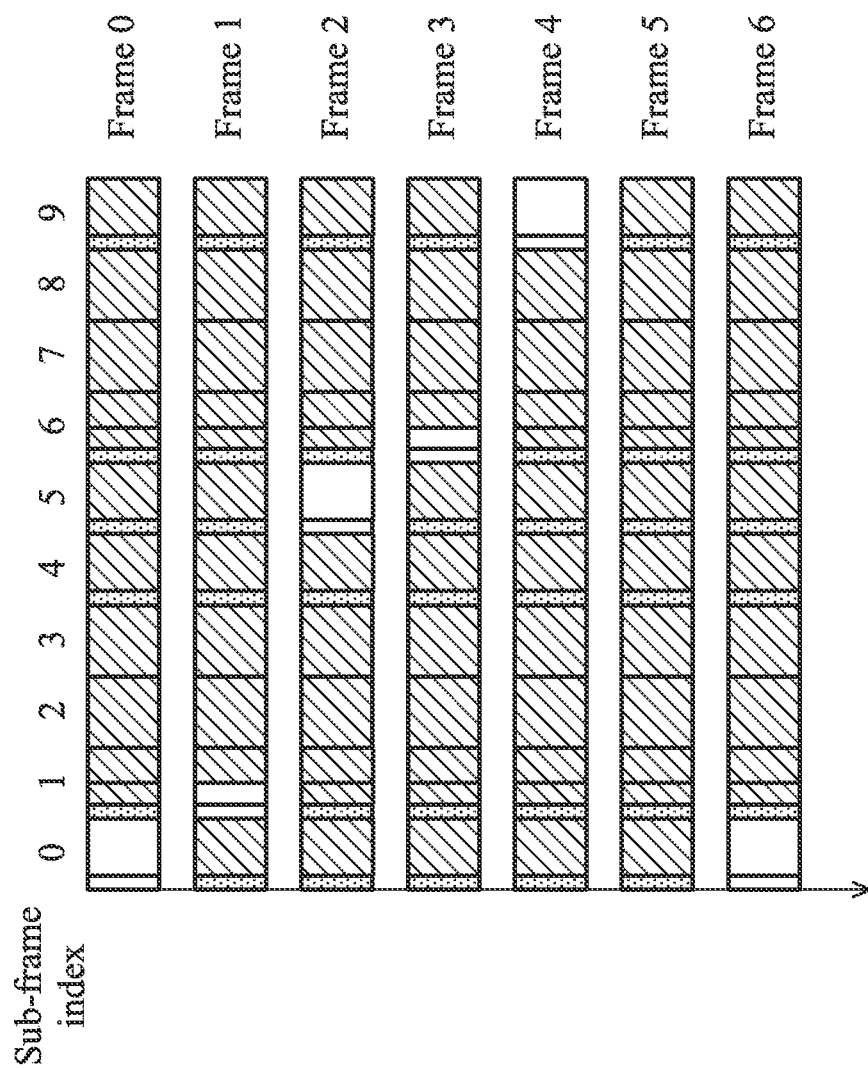
FIG. 11 shows an exemplary arrangement of several ABSs scheduled by an aggressor eNB according to yet another embodiment of the invention.

Referring back to FIG. 9a and FIG. 9b, it is noted that for TDD UL/DL configuration 6, the HART RTT is not as regular as that for TDD UL/DL configurations 1-5. In addition, for TDD UL/DL configuration 0 (which will be discussed in the following paragraphs), the HART RTT is also irregular. Because the HART RTT is irregular for the TDD UL/DL configurations 0 and 6, according to the preferred embodiments of the invention, the ABS(s) in the sub-frame pattern is/are preferably arranged in a series of contiguous frames. FIG. 11 shows an exemplary arrangement of several ABSs scheduled by an aggressor eNB according to yet another embodiment of the invention. In the embodiment, TDD UL/DL configuration 6 is taken as an example, and the ABSs are arranged by the aggressor eNB in the 0-th sub-frame of frame 0, first sub-frame of frame 1, fifth sub-frame of frame 2, sixth sub-frame of frame 3, ninth sub-frame of frame 4 and 0-th sub-frame of frame 6. Therefore, the victim eNB may transmit the uplink grant message UL_Grant and the ACK/NACK in the ABSs to avoid being interfered by the aggressor eNB.

For TDD UL/DL configuration 0, since the number of uplink sub-frames are more than the number of the downlink sub-frames, there are two indicators utilized to indicate which uplink sub-frame is associate with an uplink message or an ACK/NACK message. The first indicator is an UL index $UL_{index}$, which is a two bits indicator to indicate which uplink sub-frame is associated with a current uplink message. The second indicator is $I_{PHICH}$, which is used to indicate which sub-frame is associated with a current Physical Hybrid Automatic Repeat Request Indicator Channel (PHICH). The ACK/NACK message is transmitted through the PHICH.

FIG. 12a shows a first arrangement of values of HARQ parameter k1 in TDD UL/DL configuration 0 according to an embodiment of the invention, and FIG. 12b shows a second arrangement of values of HARQ parameter k1 in TDD UL/DL configuration 0 according to another embodiment of the invention. FIG. 13a shows a first arrangement of values of HARQ parameter k2 in TDD UL/DL configuration 0 according to an embodiment of the invention, and FIG. 13b shows a second arrangement of values of HARQ parameter k2 in TDD UL/DL configuration 0 according to another embodiment of the invention. When one of the following two conditions:

the most significant bit (MSB) of the first indicator $UL_{index}$ is '1';

the ACK/NACK message is received in sub-frame 0 or 5 and $I_{PHICH}$='0'; is met, the values of HARQ parameter k1 for TDD UL/DL configuration 0 are set as the table shown in FIG. 12a. When one of the following three conditions:

the least significant bit (LSB) of the first indicator $UL_{index}$ is '1';

the ACK/NACK message is received in sub-frame 0 or 5 and $I_{PHICH}$='1';

the ACK/NACK message is received in sub-frame 1 or 6 is met, the values of HARQ parameter k1 for TDD UL/DL configuration 0 are set as the table shown in FIG. 12b. In addition, when $I_{PHICH}$='0', the values of HARQ parameter k2 for TDD UL/DL configuration 0 are set as the table shown in FIG. 13a, and when $I_{PHICH}$='1', the values of HARQ parameter k2 for TDD UL/DL configuration 0 are set as the table shown in FIG. 13b.

In conclusion, the indices of sub-frames that are preferably set as the ABSs for different TDD UL/DL configurations are listed in Table 1.

TABLE 1 the indices of sub-frames that may be set as
ABSs for different TDD UL/DL configurations

| TDD UL/DL configuration | Possible sub-frame indices for ABSs |
| --- | --- |
| 0 | [F, 0], [F + 1, 0], [F + 2, 1], [F + 3, 5], [F + 4, 5], [F + 5, 6], [F + 6, NAN] |
| 1 | 1, 4, 6, 9 |
| 2 | 3, 8 |
| 3 | 0, 8, 9 |
| 4 | 8, 9 |
| 5 | 8 |
| 6 | [F, 0], [F + 1, 1], [F + 2, 5], [F + 3, 6], [F + 4, 9], [F + 5, NAN] |

According to an embodiment of the invention, the ABS(s) may be selected from the sub-frames listed in Table 1. Note that for the TDD UL/DL configurations 0 and 6, the set of ABS(s) is assumed to be assigned from frame F, the [i,j] represents the j-th sub-frame of the i-th frame, and the term 'NAN' means there is no ABS arranged in the corresponding frame. Note also that in order to ensure each ACK/NACK message can be decoded by the victim UE, for the TDD UL/DL configuration 0, when the MSB of the first indicator $UL_{index}$ is '1', the transmission of uplink grant message is preferably to be scheduled in frames F and F+3, and when LSB of the first indicator $UL_{index}$ is '1', the transmission of uplink grant message is preferably to be scheduled in frames F+1 and F+4.

According to an embodiment of the invention, a sub-frame pattern period for FDD and TDD modes may also be different. The sub-frame pattern period is a time period that a sub-frame pattern for describing the ABS arrangement can be applied. For the FDD, because the ABS(s) is preferably to be arranged in the (n+m*8)-th sub-frame(s), the sub-frame pattern may be a bit-string comprising 40 bits to describe the ABS arrangement in 4 contiguous frames and the sub-frame pattern period may be determined as 40 ms, which is a Least Common Multiple (LCM) of 8 and 10, where 8 is a sum of HARQ parameters k1 and k2 for FDD mode and 10 is a length of a frame. For the TDD UL/DL configurations 1-5, because a sum of HARQ parameters k1 and k2 is 10 sub-frames and the system information block 1 (SIB 1) is transmitted every two frames, the sub-frame pattern may be a bit-string comprising 20 bits to describe the ABS arrangement in 2 contiguous frames and the sub-frame pattern period may be determined as 20 ms. For the TDD UL/DL configuration 0, because the ABSs are preferably arranged in 7 contiguous frames (as shown in Table 1), the sub-frame pattern may be a bit-string comprising 70 bits to describe the ABS arrangement in 7 contiguous frames and the sub-frame pattern period may be determined as 70 ms. For the TDD UL/DL configuration 6, because the ABSs are preferably arranged in 6 contiguous frames (as shown in Table 1 and FIG. 11), the sub-frame pattern may be a bit-string comprising 60 bits to describe the ABS arrangement in 6 contiguous frames and the sub-frame pattern period may be determined as 60 ms.

Figure 14:
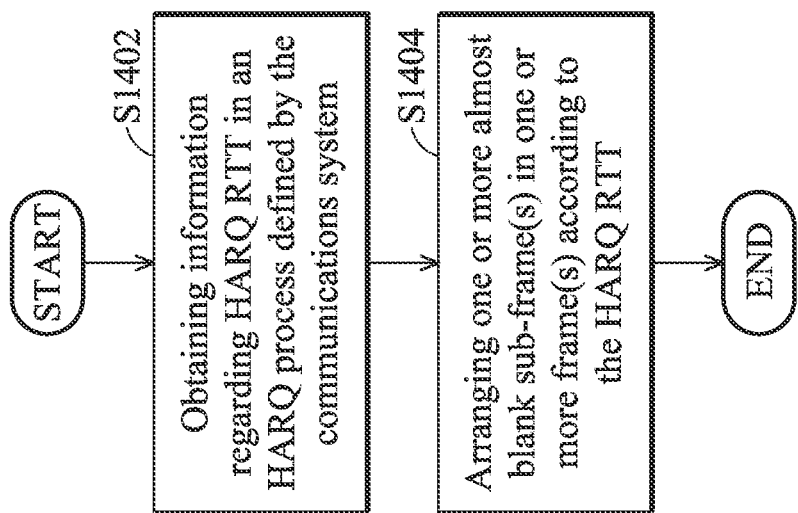
FIG. 14 is a flow chart showing a method for coordinating transmissions between different communications apparatuses according to a second aspect of the invention.

FIG. 14 is a flow chart showing a method for coordinating transmissions between different communications apparatuses according to the second aspect of the invention. The eNB (ex, an aggressor eNB) may first obtain information regarding HARQ RTT in an HARQ process defined by the communications system (Step S1402), and then arrange one or more almost blank sub-frame(s) in one or more frame(s) according to the HARQ RTT (Step S1404). Note that based on the similar concept, the eNB (ex, a victim eNB) may also schedule important control signal (such as the uplink grant message and ACK/NACK message) transmissions for victim UE(s) according to the HARQ RTT (such as the examples shown in FIG. 7, FIG. 10 and FIG. 11).

Figure 15:
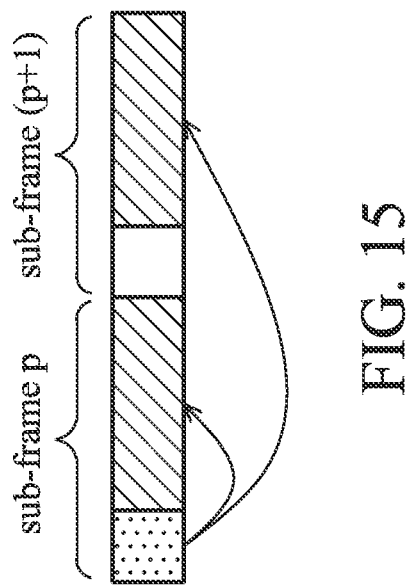
FIG. 15 shows a downlink sub-frame arrangement to describe the concept of cross sub-frame arrange for ABS according to a third aspect of the invention.

According to a third aspect of the invention, methods for cross sub-frame scheduling for ABS and the communications apparatuses utilizing the same are provided. FIG. 15 shows a downlink sub-frame arrangement to describe the concept of cross sub-frame arrangement for ABS according to the third aspect of the invention. Because the ABS is arranged for the purpose to avoid the control signal transmissions of an aggressor eNB to interfere with that of a victim eNB, according to the third aspect of the invention, the data region of the ABS may still be utilized for data transmission to increase the downlink throughput. As shown in FIG. 15, the sub-frame p is a normal sub-frame and the sub-frame (p+1) is an ABS with data transmitted therein. However, because the PCFICH and PDCCH control signals are not transmitted in the control region of the sub-frame (p+1), information regarding a start position of the data region, the resource allocation and modulation and coding scheme of the data signals of the sub-frame (p+1) cannot be obtained from the control region of the sub-frame (p+1). In this manner, when the data region of the ABS is utilized by the aggressor eNB to transmit data, the UE receiving the downlink signal from the aggressor eNB may not obtain the control information of the ABS (p+1).

To solve this problem, a sub-frame indicator is added in the PDCCH control signal for indicating whether the PDCCH control signal is utilized to describe the resource allocation of a current sub-frame or one or more sub-frame following the current sub-frame. For example, the sub-frame indicator may be a one bit indicator to indicate whether the PDCCH control signal carried in the current sub-frame is the control signal for the current sub-frame or a sub-frame following the current sub-frame. The controller module (such as the controller module 230) of the UE receiving the downlink signal from the aggressor eNB may know whether the PDCCH control signal carried in the current sub-frame is the control signal for the current sub-frame or a sub-frame following the current sub-frame after decoding the sub-frame indicator.

Besides adding a sub-frame indicator in the PDCCH control signal, the aggressor eNB may further inform the UE about a start position of the data region of the ABS (such as the sub-frame (p+1) shown in FIG. 15) in a different way. For a normal frame (such as the sub-frame p shown in FIG. 15), the eNB may carry information regarding a start position of the data region of the sub-frame p in the PCFICH control signal, and transmit the PCFICH control signal in a control region of the sub-frame p. Therefore, the UE may obtain information regarding the start position of the data region of the sub-frame p from the PCFICH control signal.

However, for an ABS (such as the sub-frame (p+1) shown in FIG. 15), because the PCFICH control signal is not transmitted in the control region of an ABS, the eNB can not carry the information therein. Therefore, according to a first embodiment of the invention, the eNB may set a start position of the data region of the ABS according to a maximum control region size defined by the communications system. The maximum control region size may be, for example and not limited to, 3 or 4 OFDM symbols, depending on the bandwidth of the OFDM carrier. In this manner, the start position of the data region is fixed of each ABS and thus, the eNB does not have to inform the UE where the start position is. FIG. 16 is a flow chart showing a method for cross sub-frame scheduling for ABS according to a first embodiment of the invention. As previously described, when the data region of a second sub-frame, which is an ABS following a first sub-frame, is utilized by an eNB to transmit data, the eNB may first carry a subframe indicator in a first control signal to be transmitted in a control region of the first sub-frame to indicate an UE that the second sub-frame following the first sub-frame is an almost blank sub-frame (Step S1602). Next, the eNB may set a start position of the data region of the second sub-frame according to a maximum control region size defined by the communications system (Step S1604). Finally, the eNB may carry data in the data region from the start position of the second sub-frame (Step S1606).

According to a second embodiment of the invention, the eNB may set a start position of the data region of an ABS in a conventional way (i.e. depending on the practical data size) and, instead of carrying the information in the control region, the eNB may further inform the UE of the information regarding the start position via radio resource control (RRC) signaling. FIG. 17 is a flow chart showing a method for cross sub-frame scheduling for ABS according to a second embodiment of the invention. As previously described, when the data region of a second sub-frame, which is an ABS following a first sub-frame, is utilized by an eNB to transmit data, the eNB may first carry a sub-frame indicator in a first control signal to be transmitted in a control region of the first sub-frame to indicate an UE that the second sub-frame following the first sub-frame is an almost blank sub-frame (Step S1702). Next, the eNB may set a start position of the data region of the second sub-frame and inform the user equipment of information regarding the start position via RRC signaling (Step S1704). Finally, the eNB may carry data in the data region from the start position of the second sub-frame (Step S1706)

Figure 18:
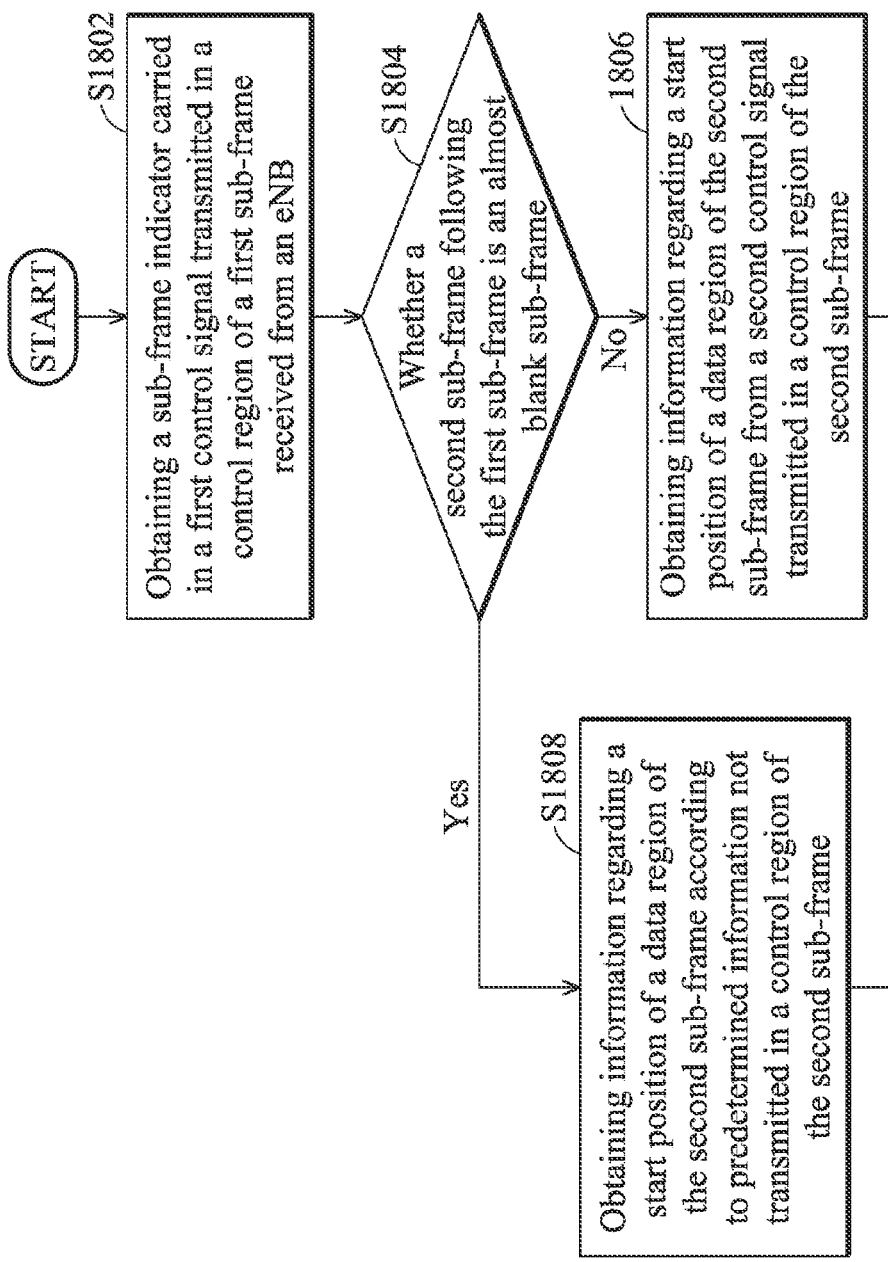
FIG. 18 is a flow chart showing a method for cross sub-frame scheduling for ABS according to a third embodiment of a third aspect of the invention.

For the UE receiving the downlink data comprising a plurality of sub-frames from the eNB, the UE may obtain information regarding a start position of the data region, the resource allocation and modulation and coding scheme of the data signals of an ABS in a corresponding way. FIG. 18 is a flow chart showing a method for cross sub-frame scheduling for ABS according to a third embodiment of the invention. The UE may first obtain a sub-frame indicator carried in a first control signal transmitted in a control region of a first sub-frame received from an eNB (Step S1802) and determine whether a second sub-frame following the first sub-frame is an almost blank sub-frame (Step S1804). When the sub-frame indicator indicates that second sub-frame is not an ABS, the UE may obtain information regarding a start position of a data region of the second sub-frame from a second control signal transmitted in a control region of the second sub-frame (Step S1806). Otherwise, the UE may obtain information regarding the start position of the data region of the second sub-frame according to predetermined information not transmitted in the control region of the second sub-frame (Step S1808). As previously described, the predetermined information may be fixed as a maximum control region size defined by the communications system and the eNB may not further inform the UE about this. In other embodiments, when the start position is not fixed and may be dynamically changed by the eNB, the eNB may inform the UE about where the start position is via RRC signaling, so that the UE may obtain the predetermined information therefrom.

Figure 19:
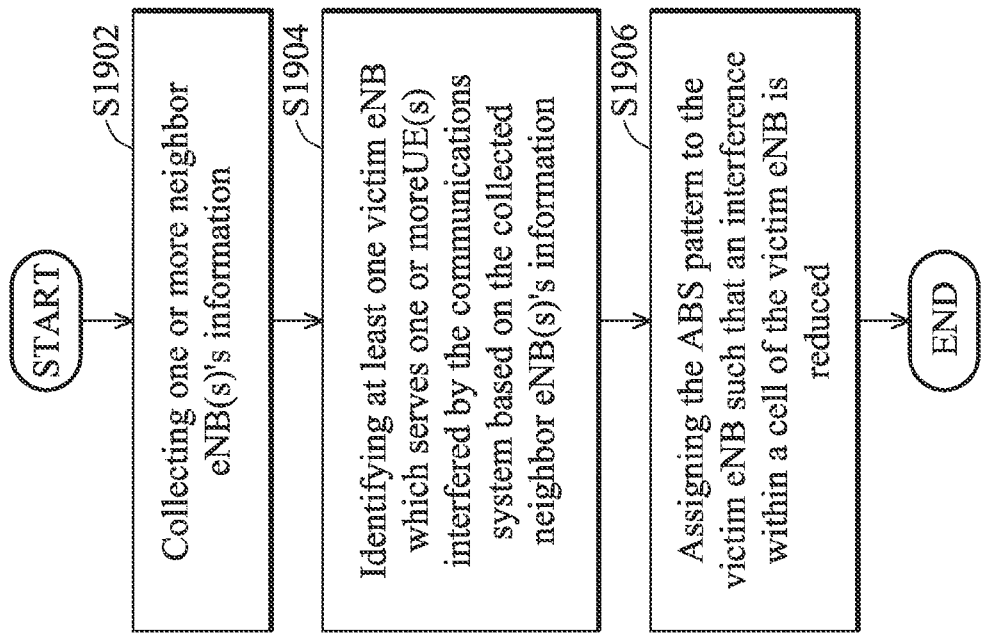
FIG. 19 is a flow chart showing a method for a communications system to assign an ABS pattern according to an embodiment of the invention; and Table 1 shows the indices of sub-frames that may be set as ABSs for different TDD UL/DL configurations.

FIG. 19 is a flow chart showing a method for a communications system to assign an ABS pattern according to an embodiment of the invention. In the embodiment, one or more neighbor eNB(s)'s information is first collected (Step S1902). The information may comprise, but not limited to, the neighbor eNB(s)'s signal power, received signal power of one or more UE(s) served by the eNB(s), the interference measured by the UE(s) served by the eNB(s), or others. Next, at least one victim eNB which serves one or more UE(s) interfered by the communications system is identified based on the collected neighbor eNB(s)'s information (Step S1904). Finally, the ABS pattern is assigned to the victim eNB such that an interference within a cell of the victim eNB is reduced (Step S1906). According to the embodiment, the ABS pattern may be assigned according to a predetermined configuration of the communications system or a predetermined configuration of the victim eNB. The predetermined configuration may be the previously described FDD configuration or TDD UL/DL configurations 0-6. For example, the ABS pattern may be assigned according to the predetermined configuration of the aggressor eNB, or the victim eNB. In addition, the ABS pattern may be assigned with a period of 8 sub-frames (for example, for the FDD configuration), 10 sub-frames (for example, for the TDD UL/DL configurations 1-5), 60 sub-frames (for example, for the TDD UL/DL configuration 6) or 70 sub-frames (for example, for the TDD UL/DL configuration 0). Note that the neighbor eNB(s)'s information may further be updated so as to periodically or a periodically adjust the assigned ABS pattern according to the updated information. Therefore, by assigning the ABS, the interference within a cell of the victim eNB can be reduced.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communications apparatus in a communications system, comprising:
   a controller module, obtaining information regarding a Hybrid Automatic Repeat Request (HARQ) round trip time (RTT) in an HARQ process, arranging one or more almost blank sub-frame(s) in one or more frame(s) according to the HARQ RTT information and generating a sub-frame pattern describing the arrangement of the almost blank sub-frame(s), wherein the HARQ RTT is defined by the communications system; and
   a transceiver module, transmitting at least a signal carrying information regarding the sub-frame pattern to a peer communications apparatus in the communications system,
   wherein at least one almost blank sub-frame in the sub-frame pattern is arranged in a sub-frame for the peer communications apparatus to transmit an uplink grant message for granting an user equipment to transmit uplink data to the peer communications apparatus.

2. The communications apparatus as claimed in claim 1, wherein at least one almost blank sub-frame in the sub-frame pattern is arranged in a sub-frame for the peer communications apparatus to transmit an acknowledgment (ACK) or a negative acknowledgment (NACK) message for informing the user equipment about whether the uplink data transmitted by the user equipment in response to the received uplink grant message have been received by the peer communications apparatus.

3. The communications apparatus as claimed in claim 1, wherein the almost blank sub-frame(s) in the sub-frame pattern is/are arranged according to a transmission period of an uplink grant message and an acknowledgment (ACK)/negative acknowledgment (NACK) message, wherein the uplink grant message is transmitted for granting an user equipment to uplink data and the ACK/NACK message is transmitted for informing the user equipment about whether the uplink data transmitted in response to the received uplink grant message have been received.

4. The communications apparatus as claimed in claim 1, wherein the almost blank sub-frame(s) in the sub-frame pattern is/are arranged in a series of contiguous frames.

5. The communications apparatus as claimed in claim 1, wherein when the HARQ RTT is defined by (k1+k2) sub-frames, the controller module arranges the almost blank sub-frame(s) in the [n+m*(k1+k2)]-th sub-frame(s) for each n-th sub-frame is assigned as an almost blank sub-frame, wherein n and m are non-negative integers, k1 and k2 are positive integers, k1 represents a sub-frame offset between an uplink grant message transmission and uplink data transmission, and k2 represents a sub-frame offset between the uplink data transmission and an ACK or a NACK message transmission.

6. The communications apparatus as claimed in claim 1, wherein a sub-frame index of the almost blank sub-frame(s) is arranged to be fixed in different frames.

* * * * *